US009341520B2

(12) United States Patent
Vadakkanmaruveedu et al.

(10) Patent No.: US 9,341,520 B2
(45) Date of Patent: May 17, 2016

(54) SYSTEM AND METHOD FOR ESTIMATING AMBIENT TEMPERATURE OF A PORTABLE COMPUTING DEVICE USING A VOICE COIL

(71) Applicant: Qualcomm Incorporated, San Diego, CA (US)

(72) Inventors: Unnikrishnan Vadakkanmaruveedu, Phoenix, AZ (US); Zenghui Zhao, San Diego, CA (US); Vinay Mitter, San Diego, CA (US); Roy Silverstein, San Diego, CA (US); Ankur Jain, San Diego, CA (US); Jon Anderson, Boulder, CO (US)

(73) Assignee: QUALCOMM INCORPORATED, San Diego, CA (US)

( * ) Notice: Subject to any disclaimer, the term of this patent is extended or adjusted under 35 U.S.C. 154(b) by 418 days.

(21) Appl. No.: 13/918,962

(22) Filed: Jun. 16, 2013

(65) Prior Publication Data

US 2014/0371944 A1    Dec. 18, 2014

(51) Int. Cl.
*G01K 7/16*    (2006.01)
*G05D 23/20*    (2006.01)
(Continued)

(52) U.S. Cl.
CPC .............. *G01K 7/16* (2013.01); *G05D 23/1917* (2013.01); *G05D 23/20* (2013.01); *G05D 23/24* (2013.01); *G06F 1/206* (2013.01)

(58) Field of Classification Search
CPC ..... G01K 7/16; G05D 23/1917; G05D 23/20; G05D 23/24; G06F 1/203; G06F 1/206
USPC ......................................................... 700/299
See application file for complete search history.

(56) References Cited

U.S. PATENT DOCUMENTS 6,760,311 B1 *    7/2004    Raith ..................... H04B 1/036
                                                            370/252
7,376,849 B2 *    5/2008    Tschanz .................. G06F 1/206
                                                            713/300
(Continued)

OTHER PUBLICATIONS

Berkhout M., et al., "A 4 2.3W class-D audio amplifier with embedded DC-DC boost converter, current-sensing ADC and DSP for adaptive speaker protection", Solid-State Circuits Conference Digest of Technical Papers (ISSCC), 2013 IEEE International, IEEE, Feb. 17, 2013, pp. 180-181, XP032350527, DOI: 10.1109/ISSCC.2013. 6487690 ISBN: 978-1-4673-4515-6 p. 180-p. 181.
(Continued)

*Primary Examiner* — Kenneth M Lo
*Assistant Examiner* — Michael J Huntley
(74) *Attorney, Agent, or Firm* — Smith Tempel

(57) ABSTRACT

Various embodiments of methods and systems for estimating environmental ambient temperature of a portable computing device ("PCD") from electrical resistance measurements taken voice coils in a speaker or microphone component are disclosed. In an exemplary embodiment, it may be recognized that the PCD is in an idle state, thus producing little or no thermal energy. Electrical resistance measurements are taken from a voice coil and used to estimate the environmental ambient temperature to which the PCD is exposed. Certain embodiments may simply render the estimated ambient temperature for the benefit of the user or use the estimated ambient temperature as an input to a program or application running on the PCD. It is envisioned that certain embodiments of the systems and methods may use the estimated ambient temperature to adjust temperature thresholds in the PCD against which thermal management policies govern thermally aggressive processing components.

36 Claims, 7 Drawing Sheets

(51) Int. Cl.
*G05D 23/24* (2006.01)
*G06F 1/20* (2006.01)
*G05D 23/19* (2006.01)

(56) References Cited

U.S. PATENT DOCUMENTS

| | | | | |
|---|---|---|---|---|
| 7,447,318 | B2* | 11/2008 | Button | H04R 3/00 381/116 |
| 7,478,253 | B2* | 1/2009 | Levit | G06F 1/3203 713/300 |
| 8,150,561 | B2* | 4/2012 | Shimotono | G06F 1/206 700/299 |
| 8,194,869 | B2 | 6/2012 | Mihelich et al. | |
| 8,477,041 | B2* | 7/2013 | Hu | H01M 8/04007 320/132 |
| 8,595,517 | B2* | 11/2013 | Riechel | G06F 1/206 361/679.54 |
| 8,768,530 | B2* | 7/2014 | Liang | G05D 23/1932 318/471 |
| 8,774,419 | B2* | 7/2014 | Risbo | H03G 11/008 381/121 |
| 9,014,384 | B2* | 4/2015 | Gautama | H03F 1/30 381/58 |
| 9,131,302 | B2* | 9/2015 | Williams | H04R 9/022 |
| 2002/0105748 | A1* | 8/2002 | Lamberts | G11B 5/012 360/69 |
| 2003/0061383 | A1* | 3/2003 | Zilka | G06F 1/3203 709/245 |
| 2006/0171662 | A1* | 8/2006 | Nagata | G06F 1/206 386/241 |
| 2006/0221568 | A1* | 10/2006 | Kardach | G06F 1/203 361/679.46 |
| 2007/0192214 | A1* | 8/2007 | Doyle | G06Q 10/087 705/28 |
| 2007/0219644 | A1* | 9/2007 | Sonobe | G06F 1/206 700/12 |
| 2008/0034232 | A1* | 2/2008 | Rangarajan | G06F 1/206 713/300 |
| 2008/0269954 | A1* | 10/2008 | Lev | G05D 23/19 700/299 |
| 2009/0299543 | A1* | 12/2009 | Cox | G06F 1/203 700/299 |
| 2010/0146313 | A1* | 6/2010 | Jager | G06F 1/206 713/320 |
| 2010/0330950 | A1* | 12/2010 | Wells | H04B 1/3883 455/404.1 |
| 2011/0182463 | A1* | 7/2011 | Lee | H04R 9/025 381/412 |
| 2011/0301777 | A1* | 12/2011 | Cox | G06F 1/206 700/299 |
| 2012/0020488 | A1* | 1/2012 | Huijser | H04R 29/003 381/59 |
| 2012/0075992 | A1* | 3/2012 | Shahidi | H04B 1/036 370/235 |
| 2012/0179303 | A1 | 7/2012 | Anderson et al. | |
| 2012/0185202 | A1* | 7/2012 | Aljabari | G01K 7/42 702/130 |
| 2013/0022207 | A1* | 1/2013 | Luo | H03G 9/005 381/55 |
| 2013/0077794 | A1 | 3/2013 | Risbo et al. | |
| 2013/0077796 | A1* | 3/2013 | Risbo | H04R 3/007 381/55 |
| 2013/0246820 | A1* | 9/2013 | Branover | G06F 1/3296 713/320 |
| 2014/0013137 | A1* | 1/2014 | Wilson | G06F 1/00 713/323 |
| 2014/0046619 | A1* | 2/2014 | Heinrich | F02D 41/20 702/130 |
| 2014/0126730 | A1* | 5/2014 | Crawley | H04R 29/001 381/59 |
| 2014/0169571 | A1* | 6/2014 | Polleros | H04R 3/007 381/55 |
| 2014/0181554 | A1* | 6/2014 | Manne | G06F 1/3234 713/323 |
| 2014/0182187 | A1* | 7/2014 | McHale | F41G 1/32 42/119 |
| 2015/0192477 | A1* | 7/2015 | Sacchetti | G01K 1/20 374/152 |

OTHER PUBLICATIONS

Berkhout M., et al., "A 4Ω 2.65W Class-D Audio Amplifier With Embedded DC-DC Boost Converter, Current Sensing ADC and DSP for Adaptive Speaker Protection", IEEE Journal of Solid-State Circuits, vol. 48, No. 12, Dec. 1, 2013, pp. 2952-2961, XP055156984, ISSN: 0018-9200, DOI: 10.1109/JSSC.2013.2284692 p. 2952-p. 2953.

Hsu T.S., et al., "Temperature Prediction of the Voice Coil of a Moving Coil Loudspeaker by Computer Simulation", Journal of the Acoustical Society of Japan (E), Tokyo, JP, vol. 21, No. 2, Mar. 1, 2000, pp. 57-62, XP008014966, ISSN: 0388-2861, DOI: 10.1250/AST.21.57 p. 57-p. 58.

International Search Report and Written Opinion—PCT/US2014/042364—ISA/EPO—Dec. 19, 2014.

* cited by examiner

SYSTEM AND METHOD FOR ESTIMATING AMBIENT TEMPERATURE OF A PORTABLE COMPUTING DEVICE USING A VOICE COIL

DESCRIPTION OF THE RELATED ART

Portable computing devices ("PCDs") are becoming necessities for people on personal and professional levels. These devices may include cellular telephones, portable digital assistants ("PDAs"), portable game consoles, palmtop computers, and other portable electronic devices.

One unique aspect of PCDs is that they typically do not have active cooling devices, like fans, which are often found in larger computing devices such as laptop and desktop computers. Instead of using fans, PCDs may rely on the spatial arrangement of electronic packaging so that two or more active heat producing components are not positioned proximally to one another. Many PCDs may also rely on passive cooling devices, such as heat sinks, to manage thermal energy among the electronic components which collectively form a respective PCD.

The reality is that PCDs are typically limited in size and, therefore, room for components within a PCD is also limited. As such, there usually isn't enough space within a PCD for engineers and designers to mitigate thermal degradation or failure of processing components by using clever spatial arrangements or strategic placement of passive cooling components. Therefore, current systems and methods rely on various temperature sensors embedded on the PCD chip to monitor the dissipation of thermal energy and then use the measurements to trigger application of thermal management techniques that adjust workload allocations, processing speeds, etc. to reduce thermal energy generation.

Notably, the temperature measurement taken near thermal energy generating components within a PCD are just one potentially relevant input for a given thermal management technique. Another relevant input for some thermal management techniques, for example, is the measurement of the ambient temperature of the environment outside the PCD. For instance, if the environmental ambient temperature can be accurately measured or estimated (i.e., the temperature to which the entire PCD is exposed), certain temperature thresholds monitored within a PCD may be adjusted so that applied thermal management techniques serve to optimize PCD performance and provide a high quality of service ("QoS") level to a user.

Therefore, what is needed in the art is a system and method for calculating the environmental ambient temperature to which a PCD is exposed by using resistance measurements associated with a speaker coil of the PCD. Further, there is also a need in the art for a system and method for using an estimated environmental ambient temperature to which a PCD is exposed as an input for a thermal management algorithm.

SUMMARY OF THE DISCLOSURE

Various embodiments of methods and systems for estimating environmental ambient temperature of a portable computing device ("PCD") from electrical resistance measurements taken from a voice coil of a speaker or microphone within the PCD are disclosed. In an exemplary embodiment, parameters associated with various components, subsystems or conditions in the PCD and indicative of processing activity are monitored. Based on the monitoring of those parameters, an idle state qualifier scenario or event may be recognized, i.e. it may be recognized that thermal energy generation in the PCD may be low enough as to not significantly affect the temperature of a voice coil component. Recognition of the idle state qualifier determines that the PCD is in an idle state.

When the PCD is determined to be in an idle state, a period of time may be allowed to pass in order to allow previously generated thermal energy to dissipate such that the temperature of a voice coil is in equilibrium, or nearly equilibrium, with the ambient temperature of the environment to which the PCD is exposed. Even so, not all embodiments of the systems and methods include such a "cool down" period after recognition of an idle state qualifier.

Next, electrical resistance measurements taken from a voice coil in a speaker component, for example, are received. Notably, because the speaker component is exposed to the ambient environment, and because the resistance of the voice coil in the speaker may be a function of its temperature, a resistance measurement from the voice coil may be used to estimate the environmental ambient temperature.

Certain embodiments may simply render the estimated ambient temperature for the benefit of the user or use the estimated ambient temperature as an input to a program or application running on the PCD. It is envisioned that certain embodiments of the systems and methods may use the estimated ambient temperature to adjust temperature thresholds in the PCD against which thermal management policies govern thermally aggressive processing components.

For instance, based on an estimated ambient temperature that is relatively cooler than a previous estimation, certain embodiments may increase the thermal threshold associated with the skin temperature of the PCD. Similarly, other embodiments may recognize the increased efficiency for thermal energy dissipation into the cooler ambient environment and allow thermally aggressive components within the PCD to run at relatively higher processing speeds. Because the PCD is determined to be exposed to a cooler ambient environment, dissipation of excess thermal energy may be more efficient to such an extent that an increase in the skin temperature of the PCD will not significantly affect the user experience. Advantageously, therefore, by recognizing the cooler ambient environment and adjusting the skin temperature threshold or allowable processing speeds upwards, embodiments of the systems and methods may provide additional processing headroom for thermally aggressive processing components.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

DETAILED DESCRIPTION

Figure 1:
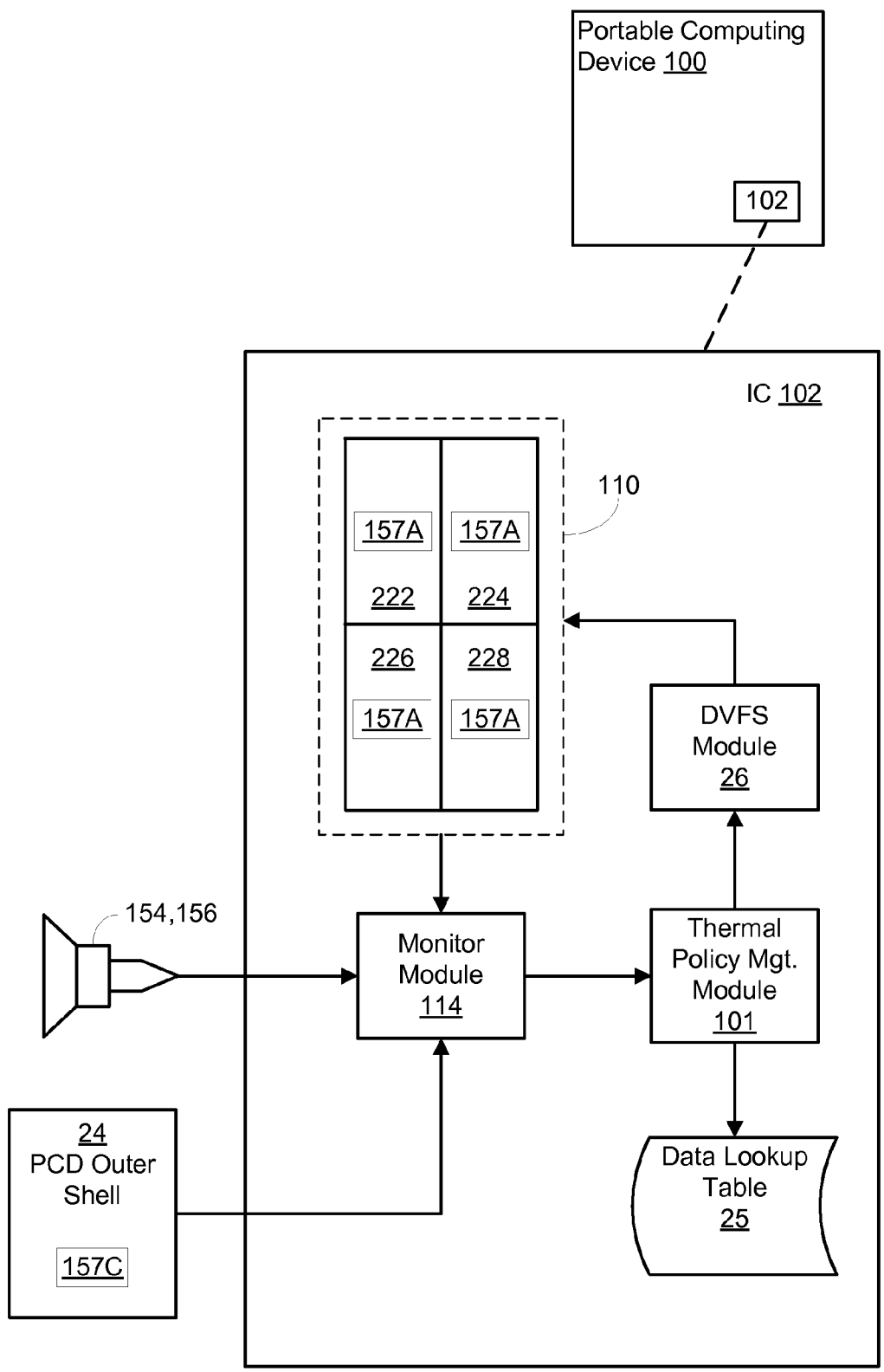
FIG. 1 is a functional block diagram illustrating an embodiment of an on-chip system for calculating environmental ambient temperature from resistance measurements associated with a speaker coil within a portable computing device ("PCD") and using the calculation as an input to a thermal management technique.

The word "exemplary" is used herein to mean "serving as an example, instance, or illustration." Any aspect described herein as "exemplary" is not necessarily to be construed as exclusive, preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

As used in this description, the terms "component," "database," "module," "system" and the like are intended to refer to a computer-related entity, either hardware, firmware, a combination of hardware and software, software, or software in execution and represent exemplary means for providing the functionality and performing the certain steps in the processes or process flows described in this specification. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "central processing unit ("CPU")," "digital signal processor ("DSP")," "graphical processing unit ("GPU")," and "chip" are used interchangeably. Moreover, a CPU, DSP, GPU or a chip may be comprised of one or more distinct processing components generally referred to herein as "core(s)."

In this description, it will be understood that the terms "thermal" and "thermal energy" may be used in association with a device or component capable of generating or dissipating energy that can be measured in units of "temperature." Consequently, it will further be understood that the term "temperature," with reference to some standard value, envisions any measurement that may be indicative of the relative warmth, or absence of heat, of a "thermal energy" generating device or component. For example, the "temperature" of two components is the same when the two components are in "thermal" equilibrium.

It will also be understood that the term "ambient temperature," with reference to some standard value, is used in this description to refer to the measurement of the relative warmth, or absence of heat, of the environment to which a PCD is exposed. For example, the "ambient temperature" of a PCD when the PCD is sitting on a desk in a user's air conditioned office may be around sixty eight degrees Fahrenheit (68° F.) whereas the "ambient temperature" of the same PCD may become around ninety degrees Fahrenheit (90° F.) when the user picks up the PCD and takes it outdoors of his office building in the month of August. As such, one of ordinary skill in the art will understand that the "ambient temperature" of a PCD is not affected by the PCD itself but may change with the physical location of the PCD.

In this description, the terms "skin temperature" and "outer shell temperature" and the like are used interchangeably to refer to a temperature associated with the outer shell or cover aspect of a PCD. As one of ordinary skill in the art would understand, the skin temperature of a PCD may be associated with a sensory experience of the user when the user is in physical contact with the PCD.

In this description, the terms "workload," "process load" and "process workload" are used interchangeably and generally directed toward the processing burden, or percentage of processing burden, associated with a given processing component in a given embodiment. Further to that which is defined above, a "processing component" or "thermal energy generating component" or "thermal aggressor" may be, but is not limited to, a central processing unit, a graphical processing unit, a core, a main core, a sub-core, a processing area, a hardware engine, etc. or any component residing within, or external to, an integrated circuit within a portable computing device.

In this description, the terms "thermal mitigation technique(s)," "thermal policies," "thermal management," "thermal mitigation measure(s)" and the like are used interchangeably. Notably, one of ordinary skill in the art will recognize that, depending on the particular context of use, any of the terms listed in this paragraph may serve to describe hardware and/or software operable to increase performance at the expense of thermal energy generation, decrease thermal energy generation at the expense of performance, or alternate between such goals.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G") and fourth generation ("4G") wireless technology have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, a laptop computer with a wireless connection, among others.

In portable computing devices, the tight spatial arrangement of thermally aggressive components lends to excessive amounts of heat being produced when those components are asked to process workloads at high performance levels. In many cases, the temperature threshold of the outer surface of the PCD, i.e. the "skin temperature," is the limiting factor in just how much thermal energy the components within the PCD are allowed to produce. Notably, the skin temperature threshold is often dictated by the maximum temperature to which a user may be exposed and not the maximum temperature to which the components themselves may be exposed. That is, the user experience as measured by the skin temperature of the PCD is often the factor from which a thermal mitigation algorithm determines that the processing performance of components within the PCD must be dialed back.

Interestingly enough, the skin temperature threshold in a PCD is often preset and fixed, even though the user experience attributable to exposure to a certain skin temperature varies depending on the ambient temperature of the environment. For instance, a PCD with a 55° C. skin temperature may adversely impact the user experience when the user is in a climate controlled office but wouldn't be noticed by the same user when the user is standing outdoors in a snow flurry. That is, one of ordinary skill in the art will recognize that thermal energy generated by thermally aggressive processing components in a PCD may be dissipated more efficiently when the PCD is exposed to a relatively cooler ambient environment and, as such, the processing components within the PCD may be run at higher processing frequencies in some scenarios where it is recognized that the PCD is exposed to cooler ambient temperatures. For this reason, in exemplary embodiments of the systems and methods disclosed herein the skin temperature threshold of a PCD may be a dynamic input, correlated to an estimated or calculated ambient temperature, to a thermal mitigation algorithm that uses the input to drive the application of one or more thermal mitigation techniques.

As stated above, embodiments of the systems and methods may raise or lower the preset skin temperature threshold of the PCD based on ambient temperature calculations. As the skin temperature threshold is adjusted, the performance levels of the processing components within the PCD may be adjusted to optimize QoS. Exemplary embodiments estimate the ambient temperature of the environment in which the PCD resides by monitoring electrical resistance values associated with one or more voice coils in speaker components of the PCD.

Notably, thermally aggressive components and subsystems in a PCD generate thermal energy when actively processing workloads. As such, certain embodiments coordinate the timing of voice coil resistance measurements with inactive periods or the recognition of idle state qualifiers of the thermally aggressive components. During these idle periods, when the thermally aggressive components are not processing significant workloads (if any), thermal energy is not being produced by the components and, therefore, an electrical resistance measurement taken from the voice coil of a speaker may not be adversely affected by thermal energy emanating from within the PCD. As such, it is envisioned that electrical resistance measurements of a speaker voice coil taken when the PCD is in an idle state may be used by some embodiments to accurately estimate the ambient temperature to which the speaker coil (and, by extension, the PCD) is exposed.

Exemplary idle state qualifiers that may be recognized by certain embodiments include, but are not limited to, an inactive video display, absence of an active battery charging cycle, current levels on a power rail, CPU frequencies, wakeup signals, etc.—essentially, an idle state qualifier may be any indication that a given thermally aggressive component or thermally aggressive activity in the PCD is not actively generating thermal energy. Similarly, other exemplary idle state qualifiers recognized by some embodiments may indicate that a speaker component is not in use such as, but not limited to, an inactive stereo/audio codec. Once an idle state qualifier, or combination of idle state qualifiers, is recognized, certain embodiments may postpone a speaker coil resistance measurement for a "cool down" period in order to make sure that the measurement is not adversely affected by thermal energy dissipating from thermal aggressors within the PCD. It is envisioned that the duration of a cool down period may be preset in certain exemplary embodiments, however, it is also envisioned that cool down periods may be variable in duration. Further, and because speaker components in some PCDs are not physically proximate to thermally aggressive components, it is envisioned that some embodiments may time speaker coil resistance measurements without regard for thermal energy levels within the PCD.

To recognize an idle state, it is envisioned that certain embodiments will monitor and compare the activity levels of components or subsystems within the PCD which are unrelated in functionality. In this way, an accurate identification of an overall idle state of the PCD may be attained. If all systems monitored are "off" then exemplary embodiments may determine that the PCD is in an idle state. As a non-limiting example, an exemplary embodiment may monitor the graphics processing unit ("GPU"), the power management integrated circuit ("PMIC") and the radio frequency ("RF") transceiver. Because few use case scenarios of the PCD would dictate that the GPU, PMIC and RF transceiver be active at the same time, recognition that each of the systems is "off" may be a valid idle state qualifier. As another non-limiting example of an idle state qualifier, an exemplary embodiment may monitor the audio amplifier and/or the stereo audio codec to recognize that the speakers are not being actively used to generate sound.

Once an idle state qualifier is recognized and any necessary wait period has lapsed, a speaker coil resistance measurement may be taken. As one of ordinary skill in the art will recognize, because the speaker coil resistance measurement is taken after recognition of an idle state qualifier, a temperature calculation derived from the speaker coil resistance may be an accurate estimation of environmental ambient temperature.

Once estimated, embodiments of the systems and methods may use the estimated ambient temperature to adjust the acceptable threshold for a skin temperature input to a thermal mitigation algorithm. It is envisioned, however, that other embodiments may use the estimated ambient temperature for other purposes such as, but not limited to, display for the benefit of the user, an input to an application such as a weather application, etc. Additionally, although exemplary embodiments are described herein relative to using the estimated ambient temperature as an input to adjust a skin temperature threshold, it is envisioned that certain embodiments may leverage the ambient temperature calculation to adjust other temperature related thresholds within the PCD including, but not limited to, temperature thresholds associated with various processing components.

For embodiments that adjust the acceptable skin temperature threshold based on the estimated ambient temperature of the PCD, the adjustment of the skin temperature threshold may be driven by user perception, as opposed to concern for the actual temperature of the outer shell aspect of the PCD. As described above, exposure to a change in environmental ambient temperature directly impacts the efficiency of the PCD to dissipate excess thermal energy and, as such, one of ordinary skill in the art would recognize that exposure to a lower ambient temperature would facilitate more efficient dissipation of thermal energy from the PCD. Recognizing this reality, embodiments may take advantage of a lowered estimation of environmental ambient temperature and allow short bursts of processing load, for example, that would otherwise be denied to avoid the generation of excess thermal energy that may adversely affect user experience due to an increase in skin temperature.

For other embodiments that adjust the acceptable skin temperature threshold based on the estimated ambient temperature of the PCD, the adjustment of skin temperature threshold may be driven by a goal of optimizing the allowable skin temperature threshold in view of original equipment manufacturer ("OEM") specification limits. For example, an OEM specification limit for a PCD skin temperature may be the lesser of 55° C. and 20° C. above ambient. In such a scenario, when the estimated ambient temperature increases from 25° C. to 35° C., for example, the maximum allowed skin temperature threshold would be 55° C., as opposed to 45° C. Recognizing this, certain embodiments may leverage the specification limit change in view of the estimated ambient temperature to take advantage of the extra thermal headroom.

As one of ordinary skill in the art would recognize, an adjustment of a temperature threshold based on a estimated ambient temperature, such as an adjustment of the skin temperature threshold, may cause a thermal management algorithm to leverage means for throttling a core up or down to an optimum performance level. As more specifically described below, throttling strategies are various methods, applications and/or algorithms that may be employed by the PCD to increase its performance through adjustment of hardware and/or software parameters, such as the clock speed of a central processing unit ("CPU") or the like. Certain throttling strategies may increase performance of a PCD at the expense of increased thermal energy generation; however, certain other throttling strategies may mitigate a detrimental rise in operating temperature by reducing PCD performance. An exemplary throttling method that may be used by embodiments of the systems and methods is a dynamic voltage and frequency scaling ("DVFS") method, described in more detail relative to FIG. 6. Even though the various exemplary embodiments described in this specification utilize throttling methodologies, such as DVFS, to manage thermal energy generation by a thermally aggressive processing component, it is envisioned that systems and methods will not be limited to using throttling techniques in an effort to optimize performance in light of a temperature threshold that has been adjusted based on an ambient temperature calculation. That is, it is envisioned that some embodiments may additionally, or exclusively, leverage operating system level thermal mitigation techniques such as, but not limited to, workload shifting techniques.

FIG. 1 is a functional block diagram illustrating an embodiment of an on-chip system 102 for calculating environmental ambient temperature from resistance measurements associated with a voice coil in a speaker 154, 156 within a portable computing device ("PCD") 100 and using the calculation as an input to a thermal management technique. To monitor operating temperatures against maximum allowed temperature thresholds, the on-chip system 102 may employ various sensors 157 for measuring temperatures associated with various components such as cores 222, 224, 226, 228 and PCD outer shell 24. Advantageously, by monitoring the temperatures associated with the various components and incrementally throttling the performance levels of thermal aggressors 222, 224, 226, 228 based on maximum allowed temperature thresholds, the QoS experienced by a user of the PCD 100 may be optimized by throttling performance only as much as necessary.

In general, the exemplary system employs three main modules which, in some embodiments, may be contained in two modules or a single module: (1) a monitor module 114 for monitoring temperature thresholds, recognizing an idle state qualifier, monitoring voice coil resistance levels and calculating environmental ambient temperature; (2) a thermal policy management ("TPM") module 101 for receiving the ambient temperature calculation from the monitor module 114 (notably, monitor module 114 and TPM module 101 may be one and the same in some embodiments), adjusting temperature thresholds based on the ambient temperature calculation and directing thermal mitigation techniques; and (3) a DVFS module 26 for implementing throttling strategies on individual processing components according to instructions received from TPM module 101. Advantageously, embodiments of the system and method that include the three main modules utilize electrical resistance data taken from a voice coil in a speaker 154, 156 to estimate the ambient temperature of the environment to which the PCD 100 is exposed. The embodiments then optimize the performance level authorized for components 110 within the PCD 100 by adjusting temperature thresholds that are affected by the ambient temperature exposure.

In the exemplary FIG. 1 embodiment, the monitor module 114 seeks to recognize an indication that PCD 100 is in an idle state and then takes measurements of electrical resistance values associated with voice coils in a speaker component 154, 156. Notably, because the speaker component 154, 156 may reside exterior to chip 102 and be exposed to the ambient environment, and because temperature may be a function of the electrical resistance in a speaker coil, the ambient temperature to which the speaker 154, 156 (and, by extension, the entire PCD 100) is exposed may be calculated from the electrical resistance measurement.

The estimated ambient temperature may be provided to the TPM module 101 which queries a temperature threshold lookup table ("LUT") 25 to determine optimum temperature threshold settings based on the estimated ambient temperature. For instance, as one of ordinary skill in the art would understand, if the estimated ambient temperature is significantly cooler than a previous calculation, the TPM module 101 may query the LUT 25 and determine that a temperature threshold associated with the outer shell aspect 24 may be raised because the cooler ambient environment would be conducive to efficient thermal energy dissipation through outer shell aspect 24. That is, the touch temperature threshold of the outer shell aspect 24 may be raised because the ambient environment is cool enough to overcome any additional thermal energy that may be generated by processing components without detrimentally impacting QoS.

Advantageously, by raising the temperature threshold associated with the outer shell aspect 24, the TPM module 101 may authorize the DVFS module 26 to increase the processing speed of one or more of the cores 222, 224, 226 and 228 in CPU 110 when a temperature reading received via monitor module 114 from sensor 157C of outer shell aspect 24 indicates that the temperature of the outer shell 24 is below the adjusted threshold. Similarly, if the estimated ambient temperature provided to the TPM module 101 from the monitor module 114 is significantly warmer than a previous calculation, the TPM module 101 may query LUT 25 and determine that the skin temperature threshold (or some other threshold) may be reduced because the warmer environment would preclude efficient dissipation of thermal energy from the PCD.

Figure 2:
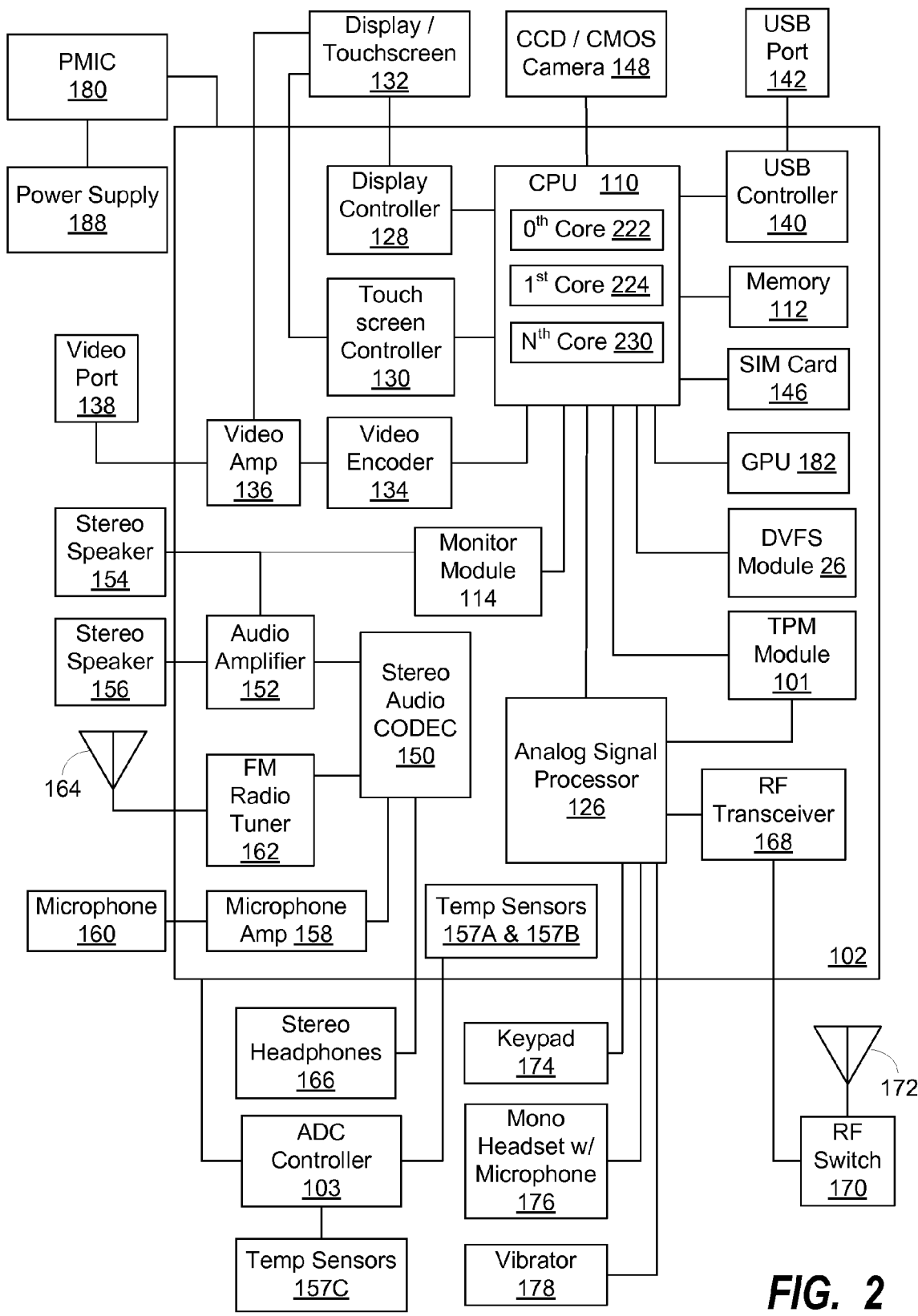
FIG. 2 is a functional block diagram illustrating an exemplary, non-limiting aspect of the PCD of FIG. 1 in the form of a wireless telephone for implementing methods and systems for calculating environmental ambient temperature and using the calculation as an input to a thermal management technique.

FIG. 2 is a functional block diagram illustrating an exemplary, non-limiting aspect of the PCD of FIG. 1 in the form of a wireless telephone for implementing methods and systems for calculating environmental ambient temperature and using the calculation as an input to a thermal management technique. Notably, in certain embodiments, the PCD 100 may simply render an estimated or calculated ambient temperature on display 132 or use the ambient temperature as an input to an application configured to provide functionality unrelated to optimization of processing performance.

As shown, the PCD 100 includes an on-chip system 102 that includes a multi-core central processing unit ("CPU") 110 and an analog signal processor 126 that are coupled together. The CPU 110 may comprise a zeroth core 222, a first core 224, and an Nth core 230 as understood by one of ordinary skill in the art. Further, instead of a CPU 110, a digital signal processor ("DSP") may also be employed as understood by one of ordinary skill in the art.

In general, the dynamic voltage and frequency scaling ("DVFS") module 26 may be responsible for implementing throttling techniques to individual processing components, such as cores 222, 224, 230 in an incremental fashion to help a PCD 100 optimize its power level and maintain a high level of functionality without detrimentally exceeding certain temperature thresholds.

The monitor module 114 communicates with multiple operational sensors (e.g., thermal sensors 157A, 157B) distributed throughout the on-chip system 102 and with the CPU 110 of the PCD 100 as well as with the TPM module 101. In some embodiments, monitor module 114 may also monitor skin temperature sensors 157C for temperature readings associated with a touch temperature of PCD 100. Further, the monitor module 114 may estimate or calculate environmental ambient temperatures based on a measurement of electrical resistance in a voice coil of a speaker 154, 156 which is exposed to the ambient environment. The TPM module 101 may receive ambient temperature calculations from monitor module 114, adjust the levels of acceptable temperature thresholds based on the ambient temperature calculations, work with the monitor module 114 to identify temperature thresholds that have been exceeded, and instruct the application of throttling strategies to identified components within chip 102 in an effort to optimize performance and QoS. Notably, by recognizing changes in the ambient temperature to which the PCD 100 is exposed, the TPM module 101 may optimize the QoS provided to a user by determining the affect of the ambient temperature change on the overall ability of the PCD 100 to dissipate thermal energy and adjusting the acceptable temperature thresholds of various processing components accordingly.

As illustrated in FIG. 2, a display controller 128 and a touch screen controller 130 are coupled to the digital signal processor 110. A touch screen display 132 external to the on-chip system 102 is coupled to the display controller 128 and the touch screen controller 130. PCD 100 may further include a video encoder 134, e.g., a phase-alternating line ("PAL") encoder, a sequential couleur avec memoire ("SECAM") encoder, a national television system(s) committee ("NTSC") encoder or any other type of video encoder 134. The video encoder 134 is coupled to the multi-core central processing unit ("CPU") 110. A video amplifier 136 is coupled to the video encoder 134 and the touch screen display 132. A video port 138 is coupled to the video amplifier 136. As depicted in FIG. 2, a universal serial bus ("USB") controller 140 is coupled to the CPU 110. Also, a USB port 142 is coupled to the USB controller 140. A memory 112 and a subscriber identity module (SIM) card 146 may also be coupled to the CPU 110. Further, as shown in FIG. 2, a digital camera 148 may be coupled to the CPU 110. In an exemplary aspect, the digital camera 148 is a charge-coupled device ("CCD") camera or a complementary metal-oxide semiconductor ("CMOS") camera.

As further illustrated in FIG. 2, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 2 shows that a microphone amplifier 158 may also be coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 2 further indicates that a radio frequency ("RF") transceiver 168 may be coupled to the analog signal processor 126. An RF switch 170 may be coupled to the RF transceiver 168 and an RF antenna 172. As shown in FIG. 2, a keypad 174 may be coupled to the analog signal processor 126. Also, a mono headset with a microphone 176 may be coupled to the analog signal processor 126. Further, a vibrator device 178 may be coupled to the analog signal processor 126. FIG. 2 also shows that a power supply 188, for example a battery, is coupled to the on-chip system 102 through PMIC 180. In a particular aspect, the power supply includes a rechargeable DC battery or a DC power supply that is derived from an alternating current ("AC") to DC transformer that is connected to an AC power source.

The CPU 110 may also be coupled to one or more internal, on-chip thermal sensors 157A, 157B as well as one or more external, off-chip thermal sensors 157C. The on-chip thermal sensors 157A may comprise one or more proportional to absolute temperature ("PTAT") temperature sensors that are based on vertical PNP structure and are usually dedicated to complementary metal oxide semiconductor ("CMOS") very large-scale integration ("VLSI") circuits. The off-chip thermal sensors 157C may comprise one or more thermistors. The thermal sensors 157C may produce a voltage drop that is converted to digital signals with an analog-to-digital converter ("ADC") controller 103. However, other types of thermal sensors 157A, 157B, 157C may be employed without departing from the scope of the invention.

The DVFS module(s) 26 and TPM module(s) 101 may comprise software which is executed by the CPU 110. However, the DVFS module(s) 26 and TPM module(s) 101 may also be formed from hardware and/or firmware without departing from the scope of the invention. The TPM module(s) 101 in conjunction with the DVFS module(s) 26 may be responsible for applying throttling policies that may help a PCD 100 avoid thermal degradation while maintaining a high level of functionality and user experience.

The touch screen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, the power supply 188, the PMIC 180 and the thermal sensors 157C are external to the on-chip system 102. However, it should be understood that the monitor module 114 may also receive one or more indications or signals from one or more of these external devices by way of the analog signal processor 126 and the CPU 110 to aid in the real time management of the resources operable on the PCD 100.

In a particular aspect, one or more of the method steps described herein may be implemented by executable instructions and parameters stored in the memory 112 that form the one or more TPM module(s) 101, monitor module(s) 114 and DVFS module(s) 26. These instructions that form the module(s) 101, 114, 26 may be executed by the CPU 110, the analog signal processor 126, or another processor, in addition to the ADC controller 103 to perform the methods described herein. Further, the processors 110, 126, the memory 112, the instructions stored therein, or a combination thereof may serve as a means for performing one or more of the method steps described herein.

Figure 3A:
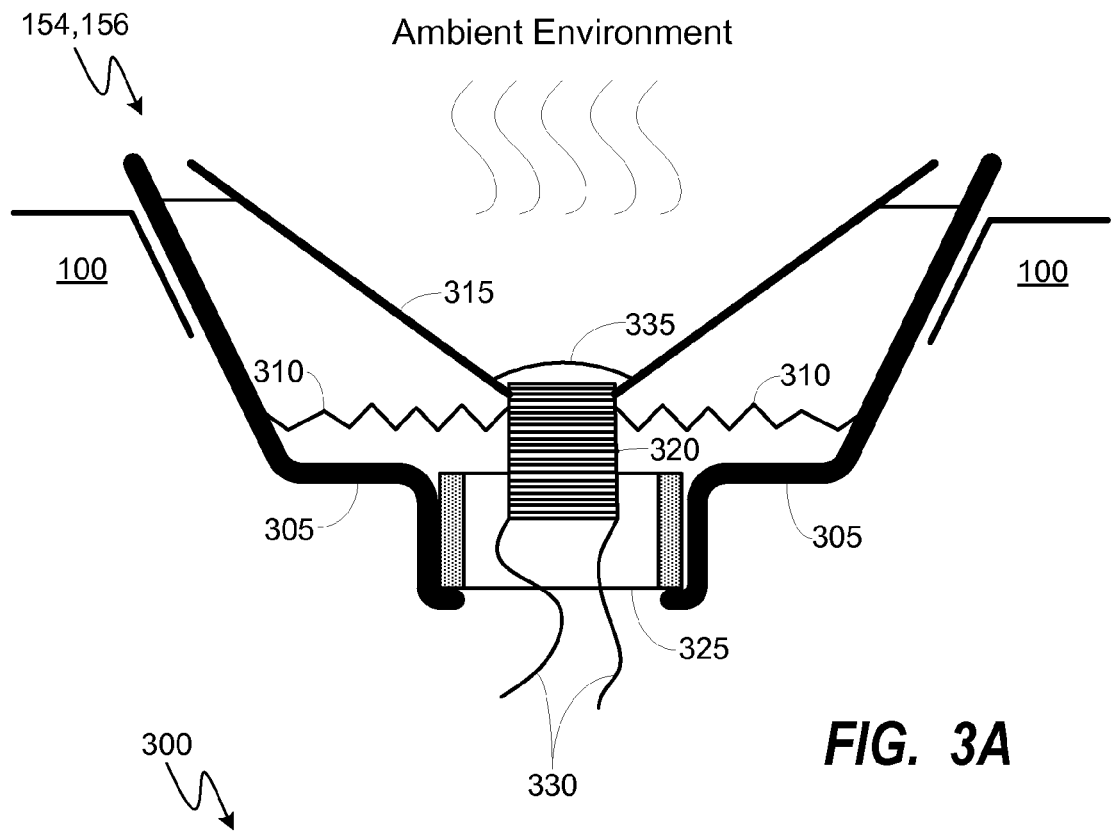
FIG. 3A is a cross-sectional illustration of an exemplary, non-limiting speaker component featured in certain embodiments of the PCD of FIG. 1.

FIG. 3A is a cross-sectional illustration of an exemplary, non-limiting speaker component 154, 156 featured in certain embodiments of the PCD of FIG. 1. The FIG. 3 illustration is offered for exemplary purposes only and does not limit the scope of the embodiments to the particular speaker construction illustrated. That is, it is envisioned that embodiments for calculating the ambient temperature of the environment in which a PCD resides may use electrical resistance measurements taken from coil components residing within any given speaker component associated with the given PCD. Further, it is envisioned that some embodiments may use electrical resistance measurements taken from coil components residing in PCD components other than speaker components such as, but not limited to, coil components residing within a microphone. Notably, because microphone components in a PCD may be exposed to the ambient environment, it is envisioned that electrical resistance measurements taken from a coil within a microphone may be used by some embodiments to estimate ambient temperature of the PCD.

Returning to the FIG. 3A illustration, as is understood by one of ordinary skill in the art, an exemplary speaker 154, 156 may be positioned at an outer point of a PCD such that it is exposed to the ambient environment of the PCD. A rigid housing 305 contains and supports other elements of the speaker 154, 156, including a cone 315, a voice coil 320 and a permanent magnet 325. A spider element 310 may also be included in some embodiments of a speaker 154, 156 for the purpose of restricting lateral movement of the voice coil 320. Some embodiments may also include a dust cover 335 for protecting the voice coil 320.

As one of ordinary skill in the art understands, when the electrical current flowing through the voice coil 320 via leads 330 changes direction, the polar orientation of the voice coil 320 reverses. In this way, the voice coil 320 is essentially an electromagnet as electrical current running through the leads 330 and coil 320 creates a magnetic field around the coil 320 that magnetizes its core. Notably, the generated magnetic field has a reversible polar orientation that changes with the reversing of current flow in the lead wires 330 and coil 320 by the amplifier 152 (shown in FIG. 2), as is understood by one of ordinary skill in the art.

Essentially, when the speakers 154, 156 are in use for generating sound, the amplifier 152 is constantly switching the electrical signal to the coil 320, fluctuating between a positive charge and a negative charge on one of the lead wires 330. This alternating current causes the polar orientation of the coil 320 to switch back and forth, each time causing the vertical position of the coil 320 to change relative to the permanent magnet 325. That is, the alternating magnetic field produced in the coil 320 is repelled from, and then attracted to, the B field generated by the permanent magnet 325. As one of ordinary skill in the art understands, the result of the vertical movement of the coil causes sound waves to be made as the attached cone 315 creates vibrations in the air.

Notably, the voice coil 320 of the speakers 154, 156 (or microphone 160 in some embodiments) is essentially exposed to the ambient environment of the PCD 100. As such, when not affected by thermal aggressors within the PCD 100 or thermal energy generated by its own use, the temperature of the voice coil 320 may approximate the ambient temperature of the environment external to the speaker 154, 156. Certain embodiments, therefore, may take measurements of the electrical resistance on the coil 320 via leads 330 in order to estimate the ambient temperature, as temperature of a coil 320 can be directly correlated with its temperature.

Figure 3B:
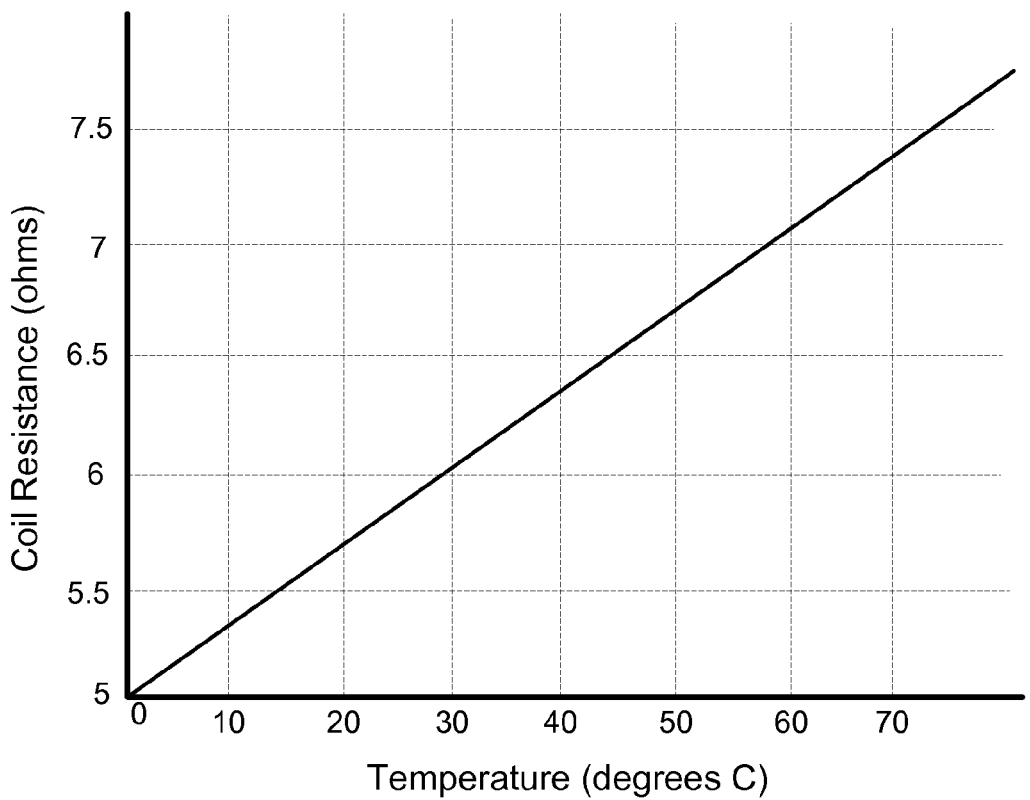
FIG. 3B is a graph depicting an exemplary relationship between temperature and electrical resistance of a certain voice coil of the speaker(s) of FIG. 1.

Turning now to FIG. 3B, a graph 300 depicts an exemplary relationship between temperature and electrical resistance of an exemplary voice coil 320. The data representative of graph 300 may be stored in LUT 25 and used by the monitor module 114 or TPM module 101 to estimate ambient temperature of the PCD 100 based on a measured electrical resistance of voice coil 320.

As one of ordinary skill in the art understands, for a conductor of uniform cross-section (such as wires 330 which form coil 320), resistance can be calculated based on material properties using the following formula:

$$R = rho(L/A)$$

where rho=resistivity of the material that forms the wires/coil 330, 320;

L=length of the wires that form the leads 330 and coil 320; and

A=cross-sectional area of the wires that form the leads 330 and coil 320

Notably, because the resistivity of the coil 320 may be a linear function of the temperature of the coil 320 (which may be in equilibrium with the ambient temperature to which the speaker 154, 156 or microphone 160 is exposed), the resistivity changes with temperature according to:

$$rho_{(A)} = rho_{(T0)}[1 + a(T_A - T0)]$$

where $rho_{(A)}$=resistivity of the wire material that forms the coil 320 when in equilibrium with the ambient temperature;

$rho_{(T0)}$=resistivity of the wire material that forms the coil 320 at some reference temperature (e.g. 20° C.);

$T_A$=ambient temperature;

$T_0$=reference temperature (e.g. 20° C.); and a=temperature coefficient of resistivity of material that forms the coil 320

As one of ordinary skill in the art would understand from the above, as the temperature of the coil 320 changes, its resistance, R, changes because the resistivity of the wires that form the coil 320 varies with the temperature. That is, the overall electrical resistance of the coil 320 is a function of its temperature:

$$R_{(A)} = R_{(T0)} + R_{(T0)}(a)(T_A - T0)$$

where $R_{(A)}$=resistance of the coil 320 when in equilibrium with the ambient temperature;

$R_{(T0)}$=resistance of the coil 320 at some reference temperature (e.g. 20° C.);

$T_A$=ambient temperature;

$T_0$=reference temperature (e.g. 20° C.); and a=temperature coefficient of resistivity of material that forms the coil 320

Using the formulas above, a function of coil resistance and temperature may be plotted and stored in the LUT 25 for reference by the TPM module 101. For any given ambient temperature with which the coil 320 may be in equilibrium, a resistance value correlating to the ambient temperature may be calculated and stored in the LUT 25. Subsequently, when the monitor module 114 measures the resistance of the coil 320 according to certain embodiments, the measurement may be used to query the data stored in LUT 25 to determine an estimated ambient temperature of the PCD. As described above and below, the ambient temperature may then be used as an input to one or more thermal management policies.

Figure 4A:
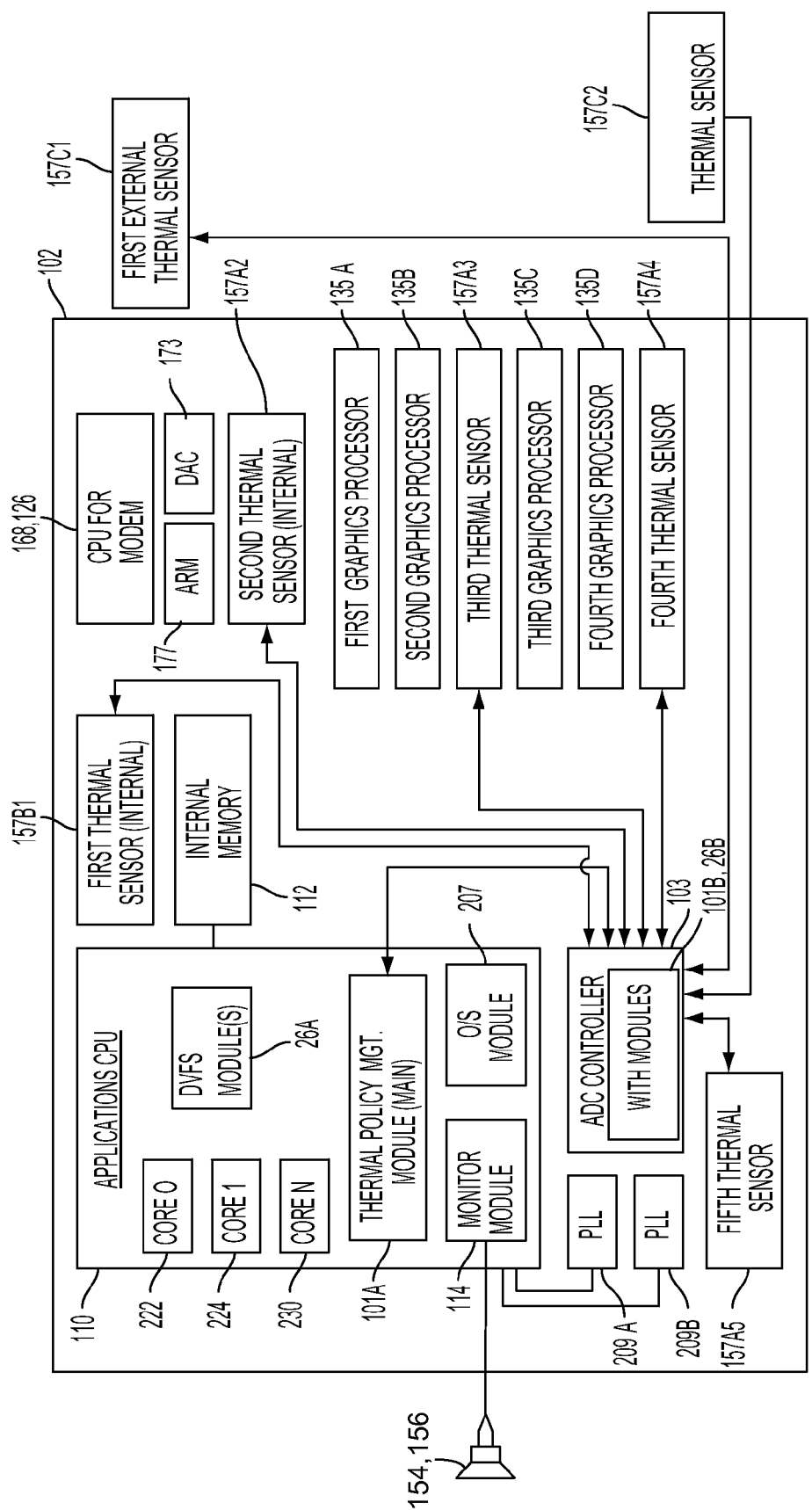
FIG. 4A is a functional block diagram illustrating an exemplary spatial arrangement of hardware for the chip illustrated in FIG. 2.

FIG. 4A is a functional block diagram illustrating an exemplary spatial arrangement of hardware for the chip 102 illustrated in FIG. 2. According to this exemplary embodiment, the applications CPU 110 is positioned on the far left side region of the chip 102 while the modem CPU 168, 126 is positioned on a far right side region of the chip 102. The applications CPU 110 may comprise a multi-core processor that includes a zeroth core 222, a first core 224, and an Nth core 230. The applications CPU 110 may be executing a TPM module 101A and/or DVFS module 26A (when embodied in software) or it may include an TPM module 101A and/or DVFS module 26A (when embodied in hardware). The application CPU 110 is further illustrated to include operating system ("O/S") module 207 and a monitor module 114. Further details about the monitor module 114 will be described below in connection with FIG. 4B.

The applications CPU 110 may be coupled to one or more phase locked loops ("PLLs") 209A, 209B, which are positioned adjacent to the applications CPU 110 and in the left side region of the chip 102. Adjacent to the PLLs 209A, 209B and below the applications CPU 110 may comprise an analog-to-digital ("ADC") controller 103 that may include its own TPM module 101B and/or DVFS module 26B that works in conjunction with the main modules 101A, 26A of the applications CPU 110.

The monitor module 114B of the ADC controller 103 may be responsible for monitoring and tracking multiple thermal sensors 157, or other sensors, that may be provided "on-chip" 102 and "off-chip" 102. The on-chip or internal thermal sensors 157A, 157B may be positioned at various locations and associated with thermal aggressor(s) proximal to the locations (such as with sensor 157A3 next to second and third thermal graphics processors 135B and 135C) or temperature sensitive components (such as with sensor 157B1 next to memory 112). The monitor module 114B may also be responsible for monitoring and recognizing various parameters associated with components of PCD 100 that indicate an idle state.

As a non-limiting example, a first internal thermal sensor 157B1 may be positioned in a top center region of the chip 102 between the applications CPU 110 and the modem CPU 168,126 and adjacent to internal memory 112. A second internal thermal sensor 157A2 may be positioned below the modem CPU 168, 126 on a right side region of the chip 102. This second internal thermal sensor 157A2 may also be positioned between an advanced reduced instruction set computer ("RISC") instruction set machine ("ARM") 177 and a first graphics processor 135A. A digital-to-analog controller ("DAC") 173 may be positioned between the second internal thermal sensor 157A2 and the modem CPU 168, 126.

A third internal thermal sensor 157A3 may be positioned between a second graphics processor 135B and a third graphics processor 135C in a far right region of the chip 102. A fourth internal thermal sensor 157A4 may be positioned in a far right region of the chip 102 and beneath a fourth graphics processor 135D. And a fifth internal thermal sensor 157A5 may be positioned in a far left region of the chip 102 and adjacent to the PLLs 209 and ADC controller 103.

One or more external thermal sensors 157C may also be coupled to the ADC controller 103. The first external thermal sensor 157C1 may be positioned off-chip and adjacent to a top right quadrant of the chip 102 that may include the modem CPU 168, 126, the ARM 177, and DAC 173. A second external thermal sensor 157C2 may be positioned off-chip and adjacent to a lower right quadrant of the chip 102 that may include the third and fourth graphics processors 135C, 135D. Notably, one or more of external thermal sensors 157C may be used to indicate the touch temperature of the PCD 100, i.e. the temperature that may be experienced by a user in contact with the PCD 100.

One of ordinary skill in the art will recognize that various other spatial arrangements of the hardware illustrated in FIG. 4A may be provided without departing from the scope of the invention. FIG. 4A illustrates yet one exemplary spatial arrangement and how the main TPM, monitor and DVFS modules 101A, 114A, 26A and ADC controller 103 with its TPM, monitor and DVFS modules 101B, 114B, 26B may recognize entry of an idle state, monitor thermal conditions that are a function of the exemplary spatial arrangement illustrated in FIG. 4A, take electrical resistance measurements associated with a voice coil component to determine an ambient temperature, adjust temperature thresholds based on the estimated ambient temperature and apply throttling strategies governed by the adjusted temperature thresholds.

Figure 4B:
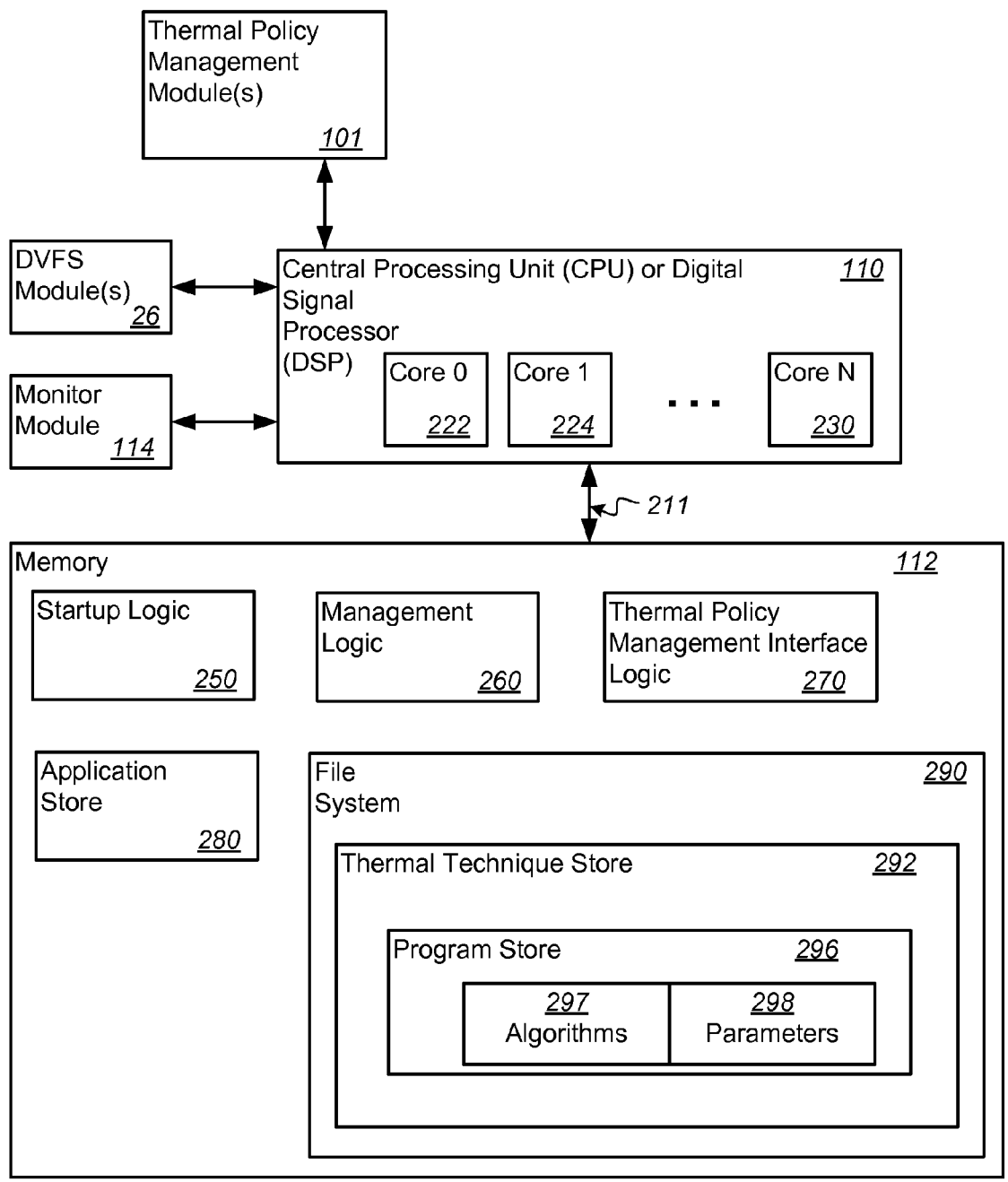
FIG. 4B is a schematic diagram illustrating an exemplary software architecture of the PCD of FIG. 2 for calculating environmental ambient temperature from resistance measurements associated with a speaker coil within the PCD and using the calculation as an input to a thermal management technique.

FIG. 4B is a schematic diagram illustrating an exemplary software architecture of the PCD 100 of FIG. 2 for estimating environmental ambient temperature from electrical resistance measurements of a voice coil and using the estimation as an input to a thermal management technique. Any number of algorithms may form or be part of at least one thermal management policy that may be applied by the TPM module 101 when certain thermal conditions are met, however, in a preferred embodiment the TPM module 101 works with the DVFS module 26 to incrementally apply voltage and frequency scaling policies to individual thermal aggressors in chip 102 including, but not limited to, cores 222, 224 and 230.

As illustrated in FIG. 4B, the CPU or digital signal processor 110 is coupled to the memory 112 via a bus 211. The CPU 110, as noted above, is a multiple-core processor having N core processors. That is, the CPU 110 includes a first core 222, a second core 224, and an $N^{th}$ core 230. As is known to one of ordinary skill in the art, each of the first core 222, the second core 224 and the $N^{th}$ core 230 are available for supporting a dedicated application or program. Alternatively, one or more applications or programs can be distributed for processing across two or more of the available cores.

The CPU 110 may receive commands from the TPM module(s) 101 and/or DVFS module(s) 26 that may comprise software and/or hardware. If embodied as software, the module(s) 101, 26 comprise instructions that are executed by the CPU 110 that issues commands to other application programs being executed by the CPU 110 and other processors.

The first core 222, the second core 224 through to the Nth core 230 of the CPU 110 may be integrated on a single integrated circuit die, or they may be integrated or coupled on separate dies in a multiple-circuit package. Designers may couple the first core 222, the second core 224 through to the $N^{th}$ core 230 via one or more shared caches and they may implement message or instruction passing via network topologies such as bus, ring, mesh and crossbar topologies.

Bus 211 may include multiple communication paths via one or more wired or wireless connections, as is known in the art. The bus 211 may have additional elements, which are omitted for simplicity, such as controllers, buffers (caches), drivers, repeaters, and receivers, to enable communications. Further, the bus 211 may include address, control, and/or data connections to enable appropriate communications among the aforementioned components.

When the logic used by the PCD 100 is implemented in software, as is shown in FIG. 4B, it should be noted that one or more of startup logic 250, management logic 260, thermal policy management interface logic 270, applications in application store 280 and portions of the file system 290 may be stored on any computer-readable medium for use by, or in connection with, any computer-related system or method.

In the context of this document, a computer-readable medium is an electronic, magnetic, optical, or other physical device or means that can contain or store a computer program and data for use by or in connection with a computer-related system or method. The various logic elements and data stores may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random-access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, for instance via optical scanning of the paper or other medium, then compiled, interpreted or otherwise processed in a suitable manner if necessary, and then stored in a computer memory.

In an alternative embodiment, where one or more of the startup logic 250, management logic 260 and perhaps the thermal policy management interface logic 270 are implemented in hardware, the various logic may be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The memory 112 is a non-volatile data storage device such as a flash memory or a solid-state memory device. Although depicted as a single device, the memory 112 may be a distributed memory device with separate data stores coupled to the digital signal processor 110 (or additional processor cores).

The startup logic 250 includes one or more executable instructions for selectively identifying, loading, and executing a select program for managing or controlling the performance of one or more of the available cores such as the first core 222, the second core 224 through to the $N^{th}$ core 230. The startup logic 250 may identify, load and execute a select program based on the adjustment by the TPM module 101 of threshold temperature settings associated with a PCD component or aspect based on receipt of an estimated ambient temperature. An exemplary select program can be found in the program store 296 of the embedded file system 290 and is defined by a specific combination of a performance scaling algorithm 297 and a set of parameters 298. The exemplary select program, when executed by one or more of the core processors in the CPU 110 may operate in accordance with one or more signals provided by the monitor module 114 in combination with control signals provided by the one or more TPM module(s) 101 and DVFS module(s) 26 to scale the performance of the respective processor core "up" or "down."

The management logic 260 includes one or more executable instructions for terminating a thermal management program on one or more of the respective processor cores, as well as selectively identifying, loading, and executing a more suitable replacement program for managing or controlling the performance of one or more of the available cores. The management logic 260 is arranged to perform these functions at run time or while the PCD 100 is powered and in use by an operator of the device. A replacement program can be found in the program store 296 of the embedded file system 290 and, in some embodiments, may be defined by a specific combination of a performance scaling algorithm 297 and a set of parameters 298.

The replacement program, when executed by one or more of the core processors in the digital signal processor 110 may operate in accordance with one or more signals provided by the monitor module 114 or one or more signals provided on the respective control inputs of the various processor cores to scale the performance of the respective processor core. In this regard, the monitor module 114 may provide one or more indicators of events, processes, applications, resource status conditions, elapsed time, temperature, etc in response to control signals originating from the TPM 101.

The interface logic 270 includes one or more executable instructions for presenting, managing and interacting with external inputs to observe, configure, or otherwise update information stored in the embedded file system 290. In one embodiment, the interface logic 270 may operate in conjunction with manufacturer inputs received via the USB port 142. These inputs may include one or more programs to be deleted from or added to the program store 296. Alternatively, the inputs may include edits or changes to one or more of the programs in the program store 296. Moreover, the inputs may identify one or more changes to, or entire replacements of one or both of the startup logic 250 and the management logic 260. By way of example, the inputs may include a change to the management logic 260 that instructs the PCD 100 to suspend all performance scaling in the RF transceiver 168 when the received signal power falls below an identified threshold. By way of further example, the inputs may include a change to the management logic 260 that instructs the PCD 100 to apply a desired program when the video codec 134 is active.

The interface logic 270 enables a manufacturer to controllably configure and adjust an end user's experience under defined operating conditions on the PCD 100. When the memory 112 is a flash memory, one or more of the startup logic 250, the management logic 260, the interface logic 270, the application programs in the application store 280 or information in the embedded file system 290 can be edited, replaced, or otherwise modified. In some embodiments, the interface logic 270 may permit an end user or operator of the PCD 100 to search, locate, modify or replace the startup logic 250, the management logic 260, applications in the application store 280 and information in the embedded file system 290. The operator may use the resulting interface to make changes that will be implemented upon the next startup of the PCD 100. Alternatively, the operator may use the resulting interface to make changes that are implemented during run time.

The embedded file system 290 includes a hierarchically arranged thermal technique store 292. In this regard, the file system 290 may include a reserved section of its total file system capacity for the storage of information for the configuration and management of the various parameters 298 and thermal management algorithms 297 used by the PCD 100. As shown in FIG. 4B, the store 292 includes a program store 296, which includes one or more thermal management programs.

Figure 5:
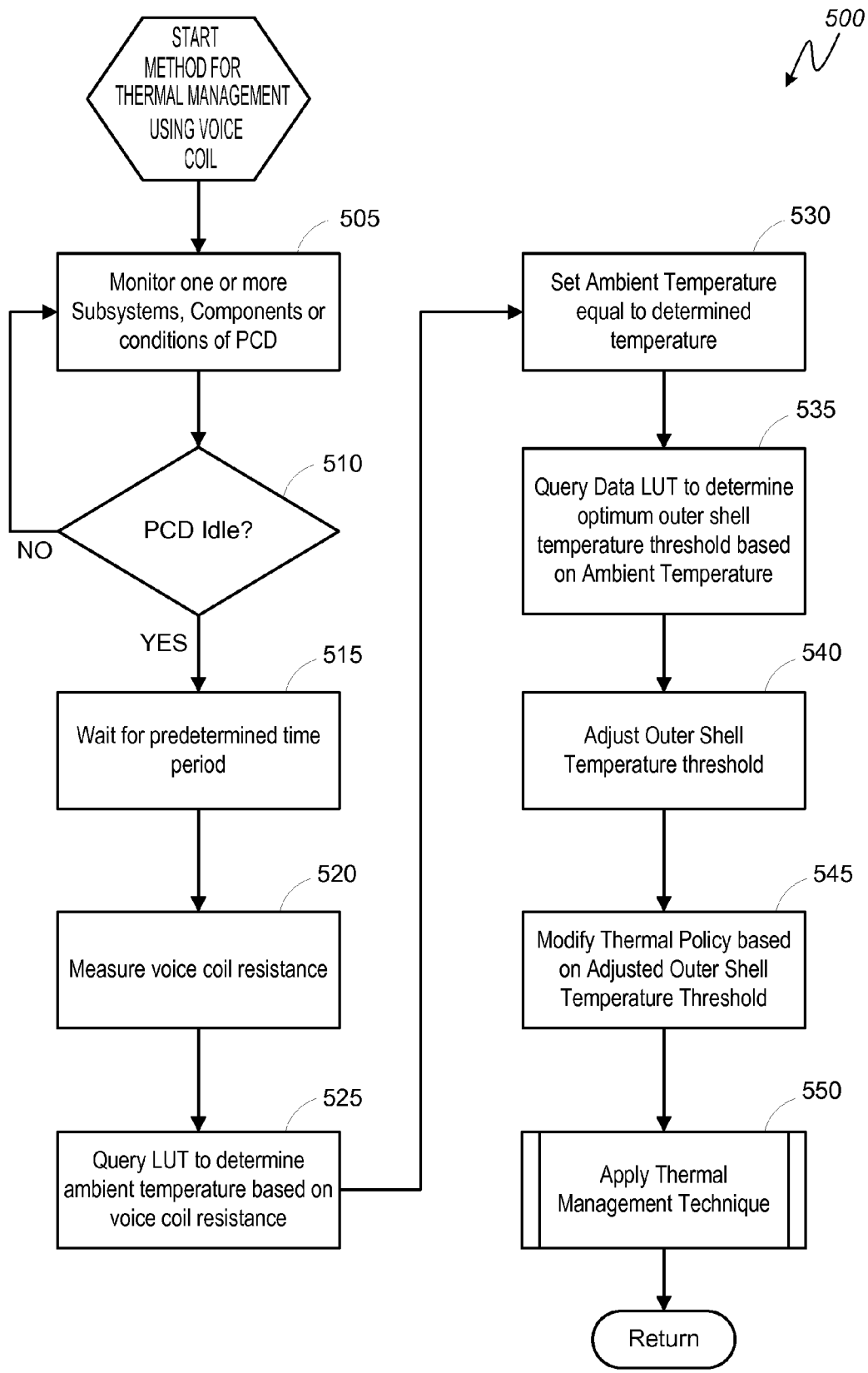
FIG. 5 is a logical flowchart illustrating a method for calculating environmental ambient temperature from resistance measurements associated with a voice coil within the PCD of FIG. 1 and using the calculation as an input to a thermal management technique.

FIG. 5 is a logical flowchart illustrating a method 500 for calculating environmental ambient temperature from resistance measurements associated with a voice coil within the PCD of FIG. 1 and using the calculation as an input to a thermal management technique. Method 500 of FIG. 5 starts with a first block 505 where a monitor module 114 monitors one or more components, subsystems and/or conditions within PCD 100 for inactivity identifiers. Any number of parameters associated with the various monitored components, subsystems and conditions may be monitored by the monitor module in an effort to identify an overall idle state of the PCD 100 or an idle state of the voice coil. As explained above, by recognizing an idle state of the PCD 100 in general or voice coil 320 in particular, embodiments may determine that the temperature of the voice coil 320 is in equilibrium, or near equilibrium, with the ambient temperature of the PCD 100. Notably, however, it is envisioned that certain embodiments may not consider an idle state of the PCD 100 or voice coil 320 before taking an electrical resistance measurement and querying an associated temperature. In such embodiments, any added thermal energy not contributable to ambient temperature exposure may be considered negligible for the purpose of estimating ambient temperature or, in other embodiments, an adjustment factor may be included in the resistance measurement and/or ambient temperature estimation to account for unrelated thermal energy sources.

At decision block 510, if the PCD 100 and/or voice coil 320 is determined to be active such that the temperature of the voice coil 320 may not be fully attributable to ambient environment exposure, the "no" branch is followed back to block 505 and monitoring of idle state qualifiers continues. If at decision block 510 it is determined that the PCD 100 and/or voice coil 320 is idle such that the temperature of the voice coil 320 may be in equilibrium, or near equilibrium, with the ambient environmental temperature, then the "yes" branch is followed to block 515.

At block 515, some embodiments of the systems and methods may apply a wait period that has been predetermined to allow previously generated thermal energy within the PCD 100 to dissipate. Advantageously, by allowing a wait period to elapse, the previously generated thermal energy may be dissipated to such a level that any temperature measurement derived from an electrical resistance measurement of coil 320 may be assumed to accurately approximate the ambient environmental temperature to which the PCD 100 is exposed. Notably, as one of ordinary skill in the art would understand, longer wait periods may allow the overall temperature of an idle PCD 100 and/or voice coil 320 to approach equilibrium with an actual ambient temperature of the environment.

Returning to the method 500, once the wait period of block 515 has elapsed, at block 520 resistance measurements may be taken from one or more voice coil(s) 320 within the PCD 100. At block 525, the LUT 25 may be queried based on the measured resistance taken at block 520 to determine a temperature of the coil 320. Notably, the temperature of the coil 320, as determined from the resistance measurement, may be equal to, or nearly equal to, the temperature of the ambient environment to which the PCD 100 is exposed. Subsequently, at block 530, the ambient temperature is set to the determined voice coil temperature.

At block 535, the LUT 25 may be queried based on the determined ambient temperature to determine an optimum skin temperature threshold setting. Notably, it is envisioned that temperature threshold settings other than skin temperature may also be adjusted in some embodiments based on the estimated ambient temperature and, as such, the scope of this disclosure and the embodiments described herein will not be limited to include adjustment of skin temperature thresholds.

At block 540, the skin temperature threshold (or other temperature threshold) is adjusted based on the LUT 25 query of block 535. As described above, the skin temperature threshold may be adjusted upward, thereby providing additional thermal energy generating headroom for one or more processing components, when the estimated ambient temperature is cooler than a previous estimation. Similarly, the skin temperature threshold may be adjusted downward, thereby reducing the amount of thermal energy that may be generated by one or more processing components, when the estimated ambient temperature is hotter than a previous estimation.

At block 545, the thermal policy may be modified based on the adjusted skin temperature such that at block 550 a thermal management technique for managing the thermal energy produced by one or more processing components is applied based on the adjusted temperature threshold as an input. For instance, with an increased skin temperature threshold at block 540, the thermal management technique applied at block 550 may increase the processing speed of one or more processing components within PCD 100, thereby increasing the QoS provided to a user of PCD 100. Similarly, with a decreased skin temperature threshold at block 540, the thermal management technique applied at block 550 may reduce the processing speed of one or more processing components within PCD 100, thereby optimizing the QoS provided to a user of PCD 100 while securing the health of the PCD 100.

Figure 6:
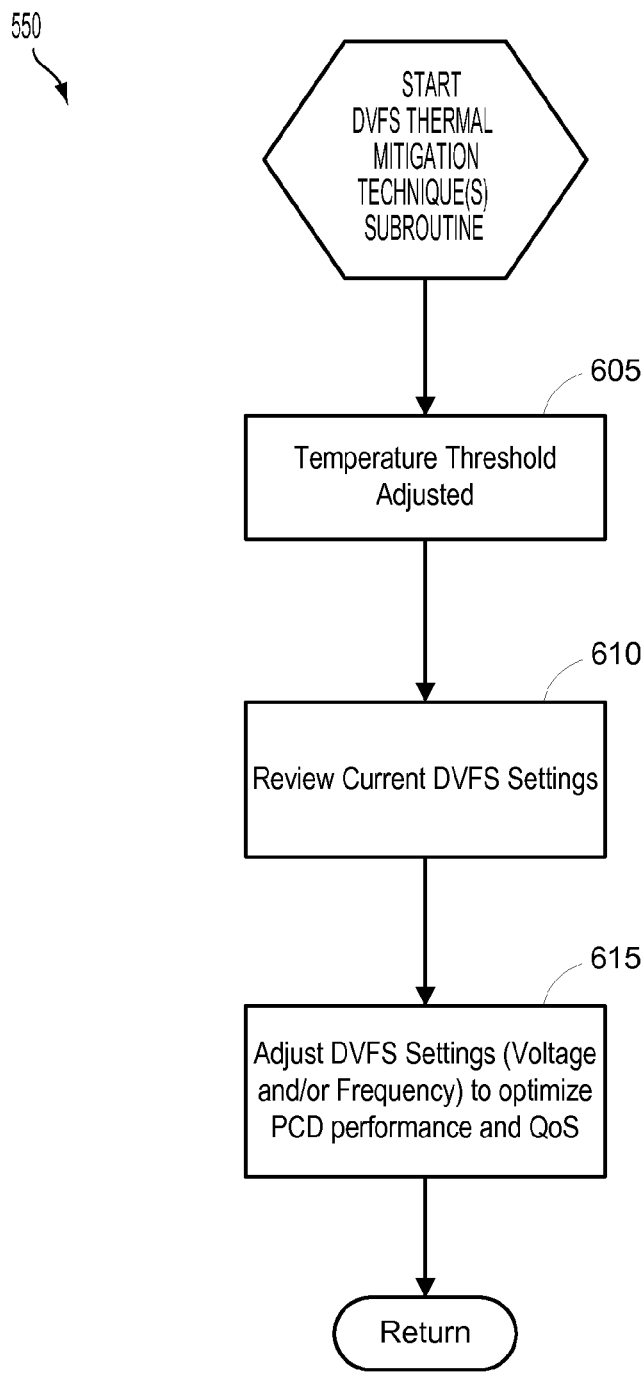
FIG. 6 is a logical flowchart illustrating a sub-method or subroutine for applying dynamic voltage and frequency scaling ("DVFS") thermal mitigation techniques that use temperature thresholds adjusted based on an estimated environmental ambient temperature.

FIG. 6 is a logical flowchart illustrating an exemplary sub-method or subroutine 550 for applying dynamic voltage and frequency scaling ("DVFS") thermal mitigation techniques that use temperature thresholds adjusted based on an estimated environmental ambient temperature. In certain embodiments, the DVFS throttling techniques may be applied to individual processing components to manage thermal energy generation within temperature thresholds.

As understood by one of ordinary skill in the art, the demand for processors that provide high performance and low power consumption has led to the use of various power management techniques, such as, dynamic voltage and frequency scaling, sometimes referred to as dynamic voltage and current scaling ("DVCS"), in processor designs. DVFS enables trade-offs between power consumption and performance. Processors 110 and 126, for instance, may be designed to take advantage of DVFS by allowing the clock frequency of each processor to be adjusted with a corresponding adjustment in voltage.

A reduction in operating voltage usually results in a proportional savings in power consumed and thermal energy generated. One main issue for DVFS enabled processors 110, 126 is how to control the balance between performance and power savings.

Block 605 is the first step in the subroutine 550 for applying DVFS thermal mitigation techniques in a thermal management framework that includes adjustable temperature thresholds. In this first block 605, the TPM module 101 may determine that a temperature threshold, such as a skin temperature threshold, may be adjusted based on an estimation of the ambient temperature of the environment in which the PCD 100 resides. Accordingly, the TPM module 101 may initiate instructions to the DVFS module 26 to review the current DVFS settings in block 610.

Next, in block 615, the DVFS module 26 may determine that the power level of the processing component can be reduced or increased, as the adjusted temperature threshold(s) may dictate or allow. In doing so, the DVFS module 26 may adjust or issue commands to incrementally adjust the current DVFS settings that may include voltage and/or frequency, in order to manage thermal loading conditions. Adjusting the settings may comprise adjusting or "scaling" the maximum clock frequency allowed in DVFS algorithm. Notably, although the monitor module 114, TPM module 101 and DVFS module 26 have been described in the present disclosure as separate modules with separate functionality, it will be understood that in some embodiments the various modules, or aspects of the various modules, may be combined into a common module for implementing adaptive thermal management policies.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the drawings, which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it will be understood that various substitutions and alterations may be made therein without departing from the spirit and scope of the present invention, as defined by the following claims.

What is claimed is:

1. A method for estimating environmental ambient temperature of a portable computing device ("PCD") from electrical resistance measurements, the method comprising:
   monitoring one or more conditions of the PCD to determine if one of the conditions indicates that the PCD is in an idle state;
   if the PCD is in an idle state, then receiving an electrical resistance measurement associated with a voice coil within the PCD;
   based on the received electrical resistance measurement, determining a temperature of the voice coil;
   based on the determined temperature of the voice coil, estimating the environmental ambient temperature of the PCD; and
   based on the estimated environmental ambient temperature, adjusting a temperature threshold associated with the PCD.

2. The method of claim 1, further comprising:
   waiting for a predetermined amount of time before receiving the electrical resistance measurement, wherein waiting the predetermined amount of time allows previously generated thermal energy in the PCD to dissipate prior to receiving the electrical resistance measurement.

3. The method of claim 1, wherein the voice coil is comprised within a component of the PCD selected from a group of components comprising a speaker and a microphone.

4. The method of claim 1, further comprising:
   rendering an indication of the estimated environmental ambient temperature.

5. The method of claim 1, wherein the temperature threshold is associated with an outer shell aspect of the PCD.

6. The method of claim 1, wherein the temperature threshold is increased.

7. The method of claim 6, further comprising:
   increasing the processing speed of one or more processing components within the PCD.

8. The method of claim 1, wherein the temperature threshold is decreased.

9. The method of claim 8, further comprising:
   decreasing the processing speed of one or more processing components within the PCD.

10. A computer system for estimating environmental ambient temperature of a portable computing device ("PCD") from electrical resistance measurements, the system comprising:
   a monitor module configured to:
      monitor one or more conditions of the PCD to determine if one of the conditions indicates that the PCD is in an idle state;
      if the PCD is in an idle state, receive an electrical resistance measurement associated with a voice coil within the PCD;
      based on the received electrical resistance measurement, determine a temperature of the voice coil; and
      based on the determined temperature of the voice coil, estimate the environmental ambient temperature of the PCD; and
   a thermal policy manager ("TPM") module configured to:
      based on the estimated environmental ambient temperature, adjust a temperature threshold associated with the PCD.

11. The computer system of claim 10, wherein the monitor module is further configured to:
   wait for a predetermined amount of time before receiving the electrical resistance measurement, wherein waiting the predetermined amount of time allows previously generated thermal energy in the PCD to dissipate prior to receiving the electrical resistance measurement.

12. The computer system of claim 10, wherein the voice coil is comprised within a component of the PCD selected from a group of components comprising a speaker and a microphone.

13. The computer system of claim 10, wherein the monitor module is further configured to:
   render an indication of the estimated environmental ambient temperature.

14. The computer system of claim 10, wherein the temperature threshold is associated with an outer shell aspect of the PCD.

15. The computer system of claim 10, wherein the temperature threshold is increased.

16. The computer system of claim 15, further comprising:
   a dynamic voltage and frequency scaling ("DVFS") module configured to:
      increase the processing speed of one or more processing components within the PCD.

17. The computer system of claim 10, wherein the temperature threshold is decreased.

18. The computer system of claim 17, further comprising:
   a dynamic voltage and frequency scaling ("DVFS") module configured to:
      decrease the processing speed of one or more processing components within the PCD.

19. A computer system for estimating environmental ambient temperature of a portable computing device ("PCD") from electrical resistance measurements, the system comprising:
   means for monitoring one or more conditions of the PCD to determine if one of the conditions indicates that the PCD is in an idle state;
   means for receiving an electrical resistance measurement associated with a voice coil within the PCD if the PCD is in an idle state;
   means for determining a temperature of the voice coil based on the received electrical resistance measurement;
   means for estimating the environmental ambient temperature of the PCD based on the determined temperature of the voice coil; and
   means for adjusting a temperature threshold associated with the PCD based on the estimated environmental ambient temperature.

20. The computer system of claim 19, further comprising:
   means for waiting for a predetermined amount of time before receiving the electrical resistance measurement, wherein waiting the predetermined amount of time allows previously generated thermal energy in the PCD to dissipate prior to receiving the electrical resistance measurement.

21. The computer system of claim 19, wherein the voice coil is comprised within a component of the PCD selected from a group of components comprising a speaker and a microphone.

22. The computer system of claim 19, further comprising:
   means for rendering an indication of the estimated environmental ambient temperature.

23. The computer system of claim 19, wherein the temperature threshold is associated with an outer shell aspect of the PCD.

24. The computer system of claim 19, wherein the temperature threshold is increased.

25. The computer system of claim 24, further comprising:
   means for increasing the processing speed of one or more processing components within the PCD.

26. The computer system of claim 19, wherein the temperature threshold is decreased.

27. The computer system of claim 26, further comprising:
   means for decreasing the processing speed of one or more processing components within the PCD.

28. A computer program product comprising a non-transitory computer usable device having a computer readable program code embodied therein, said computer readable program code adapted to be executed to implement a method for estimating environmental ambient temperature of a portable computing device ("PCD") from electrical resistance measurements, said method comprising:
   monitoring one or more conditions of the PCD to determine if one of the conditions indicates that the PCD is in an idle state;
   if the PCD is in an idle state, then receiving an electrical resistance measurement associated with a voice coil within the PCD;
   based on the received electrical resistance measurement, determining a temperature of the voice coil;
   based on the determined temperature of the voice coil, estimating the environmental ambient temperature of the PCD; and
   based on the estimated environmental ambient temperature, adjusting a temperature threshold associated with the PCD.

29. The computer program product of claim 28, further comprising:
   waiting for a predetermined amount of time before receiving the electrical resistance measurement, wherein waiting the predetermined amount of time allows previously generated thermal energy in the PCD to dissipate prior to receiving the electrical resistance measurement.

30. The computer program product of claim 28, wherein the voice coil is comprised within a component of the PCD selected from a group of components comprising a speaker and a microphone.

31. The computer program product of claim 28, further comprising:
   rendering an indication of the estimated environmental ambient temperature.

32. The computer program product of claim 28, wherein the temperature threshold is associated with an outer shell aspect of the PCD.

33. The computer program product of claim 28, wherein the temperature threshold is increased.

34. The computer program product of claim 33, further comprising:
   increasing the processing speed of one or more processing components within the PCD.

35. The computer program product of claim 28, wherein the temperature threshold is decreased.

36. The computer program product of claim 35, further comprising:
   decreasing the processing speed of one or more processing components within the PCD.

* * * * *